United States Patent
Sawamoto

(10) Patent No.: US 8,723,910 B2
(45) Date of Patent: May 13, 2014

(54) OPTICAL SCANNING DEVICE AND IMAGE FORMING APPARATUS USING SAME

(71) Applicant: KYOCERA Document Solutions Inc., Osaka (JP)

(72) Inventor: Chika Sawamoto, Osaka (JP)

(73) Assignee: Kyocera Document Solutions Inc. (JP)

( * ) Notice: Subject to any disclaimer, the term of this patent is extended or adjusted under 35 U.S.C. 154(b) by 48 days.

(21) Appl. No.: 13/683,481

(22) Filed: Nov. 21, 2012

(65) Prior Publication Data

US 2013/0147890 A1    Jun. 13, 2013

(30) Foreign Application Priority Data

Dec. 8, 2011 (JP) .................. 2011-269015

(51) Int. Cl.
*B41J 2/435* (2006.01)
*B41J 27/00* (2006.01)

(52) U.S. Cl.
USPC ........... 347/263; 347/235; 347/250; 347/242; 347/241

(58) Field of Classification Search
USPC .................... 347/235, 241, 242, 250, 263
See application file for complete search history.

(56) References Cited

U.S. PATENT DOCUMENTS

| | | | |
|---|---|---|---|
| 6,320,647 B1 * | 11/2001 | Makino | 355/67 |
| 2001/0019564 A1 | 9/2001 | Okuwaki et al. | |
| 2002/0012041 A1 | 1/2002 | Mogi et al. | |
| 2009/0153644 A1 | 6/2009 | Naito | |
| 2009/0201358 A1 * | 8/2009 | Nakamura | 347/260 |

FOREIGN PATENT DOCUMENTS

| | | | |
|---|---|---|---|
| JP | 2-118612 | | 5/1990 |
| JP | 2001100128 | | 9/1999 |
| JP | 2002-189180 | | 7/2002 |
| JP | 2002189180 A | * | 7/2002 |
| JP | 2008139664 | | 6/2008 |

* cited by examiner

*Primary Examiner* — Sarah Al Hashimi

(74) *Attorney, Agent, or Firm* — Gerald E. Hespos; Michael J. Porco; Matthew T. Hespos

(57) ABSTRACT

An optical scanning device includes a light source, a deflector for deflecting and scanning the beams of light, an imaging optical system, a housing, a synchronization sensor, a circuit board on which the light source and the synchronization sensor are mounted, and an adjustment mechanism. The adjustment mechanism enables an adjustment of an interval between beams of light respectively emitted from the plurality of emission points on a surface to be scanned. The circuit board includes a first part on which the light source is mounted, a second part on which the synchronization sensor is mounted and an intermediate part between the first and second parts. The first part is arranged outside the housing, the second part is arranged inside the housing and the intermediate part passes through a wall surface of the housing. The adjustment mechanism fixes the light source using the housing with the interval adjusted.

8 Claims, 9 Drawing Sheets

OPTICAL SCANNING DEVICE AND IMAGE FORMING APPARATUS USING SAME

This application is based on Japanese Patent Application Serial No. 2011-269015 filed with the Japan Patent Office on Dec. 8, 2011, the contents of which are hereby incorporated by reference.

BACKGROUND

The present disclosure relates to an optical scanning device using a multi-beam light source and an image forming apparatus using this.

A laser printer, a copier and the like include an optical scanning device for forming an electrostatic latent image on the circumferential surface (surface to be scanned) of a photoconductive drum by scanning and exposing the circumferential surface with a laser beam. The optical scanning device includes a BD (Beam Detect) sensor on which a part of the laser beam is incident to synchronize a write start timing on the photoconductive drum. Normally, a laser light source for emitting the laser beam is mounted on a circuit board (APC board) mounted with an APC (Auto Power Control) circuit, and the BD sensor is mounted on a circuit board different from the APC board.

A single-beam optical scanning device is known in which a laser light source and a BD sensor are mounted on the same circuit board. According to this device, the number of sensors used can be reduced and a drive circuit can be shared by the both.

Further, a multi-beam optical scanning device is known in which a multi-beam laser light source and a BD sensor are mounted on the same circuit board. In a multi-beam system, a dot pitch in a sub scanning direction on a photoconductive drum needs to be adjusted according to a set resolution (dpi) of an image. This adjustment is performed by slightly rotating the laser light source about an optical axis. However, in the case of mounting the laser light source and the BD sensor on the same circuit board, a problem arises in which the position of the BD sensor changes according to the rotation about the optical axis and a laser beam is not incident on a light receiving surface of the BD sensor. In this device, using an optical element (anamorphic lens) for converting a spot of a detection beam propagating toward the BD sensor into a spot long in the sub scanning direction, the detection beam can be detected by the BD sensor even if the position of the BD sensor is shifted due to the rotation.

However, according to the technique of the above device, a special optical element for forming a detection laser beam to be incident on the BD sensor is separately necessary. This leads to an increase in the number of components and a cost increase. On the other hand, in the case of mounting the laser light source and the BD sensor on the same circuit board without using any special optical element as described above, how to adjust the rotation of the laser light source about the optical axis and fix the laser light source on the circuit board thereafter becomes problematic.

An object of the present disclosure is to provide a multi-beam optical scanning device capable of precisely fixing a circuit board while adopting a configuration for mounting a light source and a sensor for synchronizing a write time on the same circuit board, and an image forming apparatus using this.

SUMMARY

An optical scanning device according to one aspect of the present disclosure includes a light source, a deflector, an imaging optical system, a housing, a synchronization sensor, a circuit board and an adjustment mechanism. The light source includes a plurality of emission points for emitting beams of light. The deflector deflects and scans the beams of light by reflecting the beams of light. The imaging optical system images the deflected and scanned beams of light on a surface to be scanned. The housing houses at least the deflector and the imaging optical system. The synchronization sensor receives the deflected and scanned beams of light and outputs a detection signal indicating light reception. The light source and the synchronization sensor are mounted on the circuit board. The adjustment mechanism enables an adjustment of an interval between the beams of light respectively emitted from the plurality of emission points on the surface to be scanned by rotating the light source about an optical axis of the light source.

The circuit board includes a first part on which the light source is mounted, a second part on which the synchronization sensor is mounted and an intermediate part between the first and second parts. The first part is arranged outside the housing, the second part is arranged inside the housing and the intermediate part passes through a wall surface of the housing. The adjustment mechanism fixes the light source using the housing with the interval adjusted.

These and other objects, features and advantages of the present disclosure will become more apparent upon reading the following detailed description along with the accompanying drawings.

DETAILED DESCRIPTION

Figure 1:
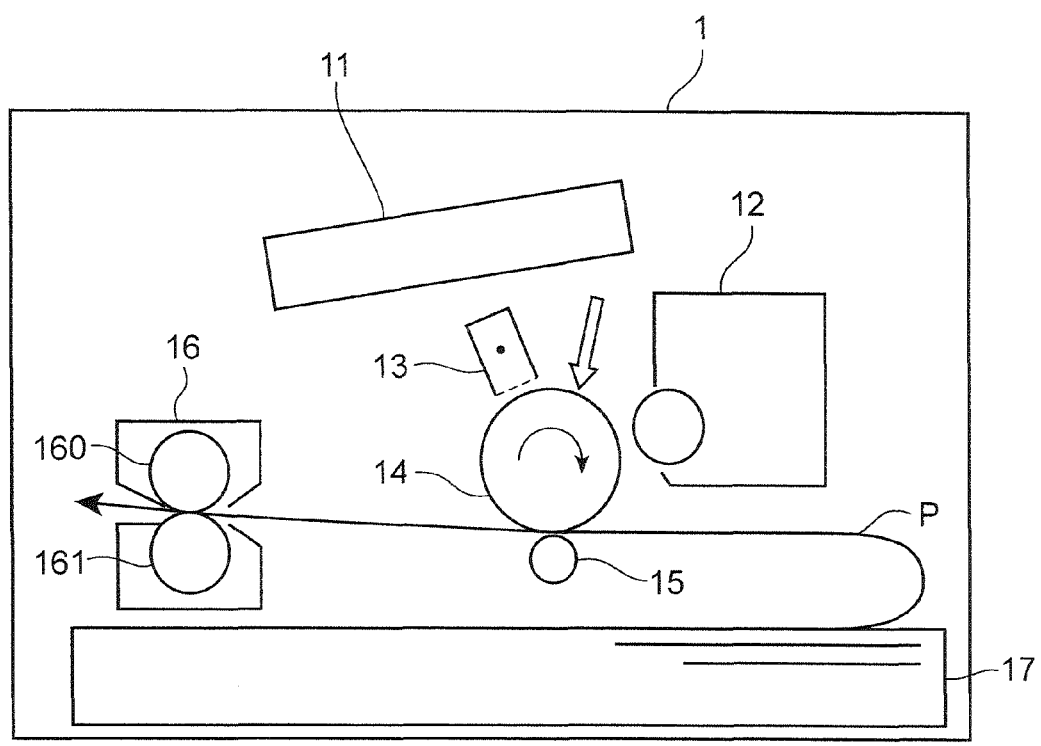
FIG. 1 is a sectional view showing the internal configuration of an image forming apparatus according to one embodiment of the present disclosure.

Hereinafter, an optical scanning device according to one embodiment of the present disclosure is described with reference to the drawings. FIG. 1 is a sectional view schematically showing the configuration of an image forming apparatus 1 in which an optical scanning device 11 according to the embodiment of the present disclosure is mounted. Although a printer is illustrated as an image forming apparatus in this embodiment, the present disclosure is also applicable to a copier, a facsimile machine or a complex machine provided with various functions. The image forming apparatus 1 includes the optical scanning device 11, a developing unit 12, a charger 13, a photoconductive drum 14 (image bearing member), a transfer roller 15, a fixing unit 16 and a sheet cassette 17.

The optical scanning device 11 is a multi-beam optical scanning device, provided with a multi-beam laser light source, a deflector, and an imaging optical system including scanning lenses and optical elements, and forms an electrostatic latent image of image data by irradiating laser light corresponding to the image data to the circumferential surface (surface to be scanned) of the photoconductive drum 14 substantially uniformly charged by the charger 13. This optical scanning device 11 is described in detail later.

The developing unit 12 forms a toner image by supplying a toner to the circumferential surface of the photoconductive drum on which an electrostatic latent image is formed. The developing unit 12 includes a developing roller for bearing the toner and a screw for agitating and conveying the toner. A toner image formed on the photoconductive drum 14 is transferred to a recording sheet fed from the sheet cassette 17 and conveyed along a conveyance path P. The transfer roller 15 is made of electrically conductive rubber or the like and a transfer bias is applied thereto to transfer the toner image formed on the photoconductive drum 14 to the recording sheet.

The fixing unit 16 includes a fixing roller 160 with a built-in heater and a pressure roller 161 provided at a position facing the fixing roller 160, and fixes a toner image formed on a recording sheet.

Next, an image forming operation of the image forming apparatus 1 is briefly described. First, the circumferential surface of the photoconductive drum 14 is substantially uniformly charged by the charger 13. The circumferential surface of the photoconductive drum 14 is exposed to light by the optical scanning device 11 and an electrostatic latent image of an image to be formed on a recording sheet is formed on the circumferential surface of the photoconductive drum 14. This electrostatic latent image is developed as a toner image by supplying the toner to the circumferential surface of the photoconductive drum 14. On the other hand, the recording sheet is fed to the conveyance path P from the sheet cassette 17. The toner image is transferred to the recording sheet by the passage of the recording sheet through a nip portion between the transfer roller 15 and the photoconductive drum 14. After this transfer operation is performed, the recording sheet is conveyed to the fixing unit 16 and the toner image is fixed thereto.

Figure 2:
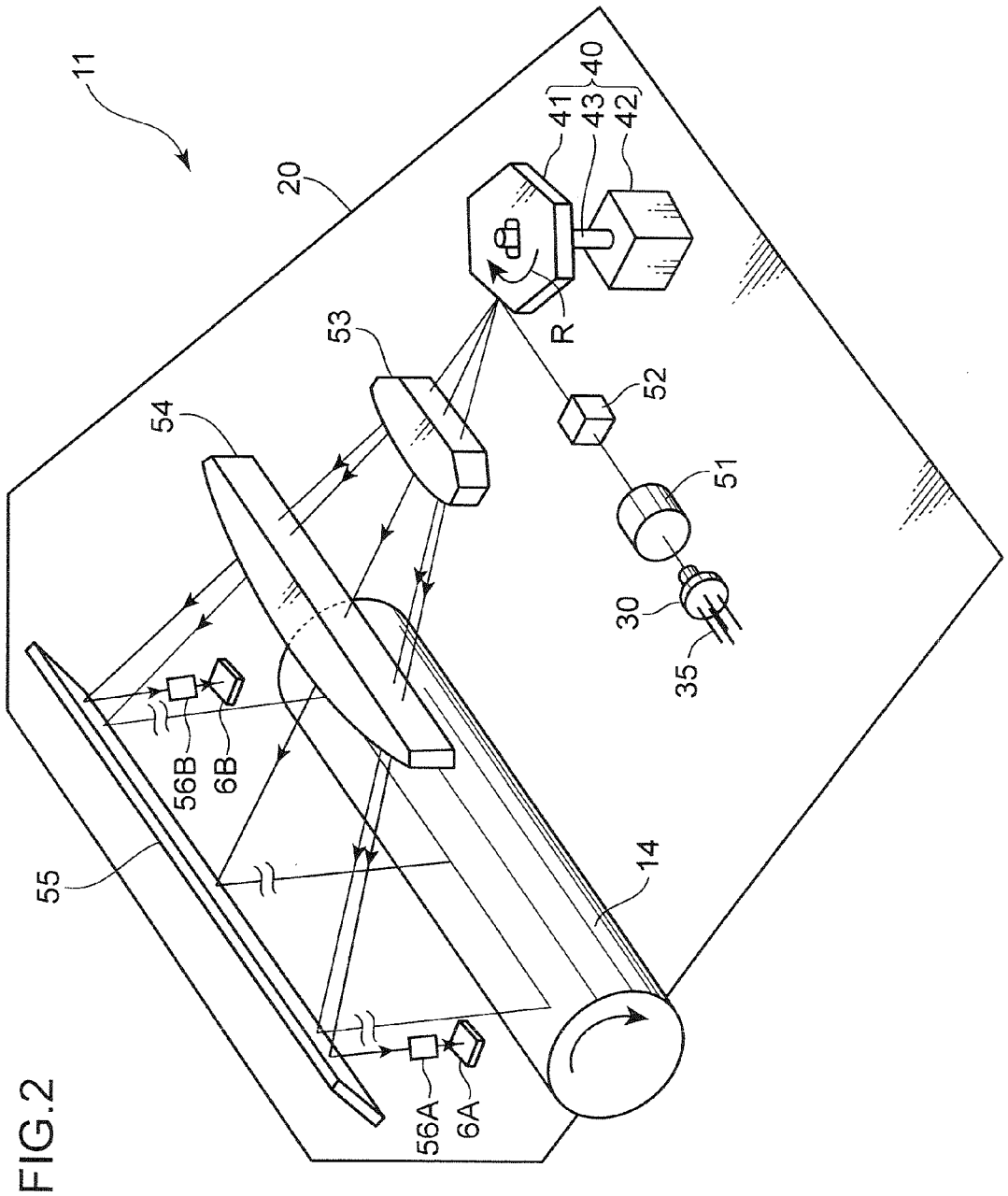
FIG. 2 is a perspective view diagrammatically showing the internal configuration of an optical scanning device.

The optical scanning device 11 includes, as shown in FIG. 2, a housing 20, a laser light source 30 (light source) housed in the housing 20, a deflector 40 for deflecting and scanning a beam of light emitted from the laser light source 30 by reflecting it, an imaging optical system for imaging the deflected and scanned beam of light on the circumferential surface of the photoconductive drum 14, and first and second BD (Beam Detect) sensors 6A, 6B (synchronization sensor). The imaging optical system includes a collimator lens 51, a cylindrical lens 52, a first scanning lens 53, a second scanning lens 54, a mirror 55 and first and second condenser lenses 56A, 56B.

The laser light source 30 includes a light emitter 30A with a plurality of emission points for emitting beams of light and configured to emit a multi-beam laser, and a lead portion 35 for feeding power to the light emitter 30A. The light emitter 30A is a monolithic multi-laser diode which includes a cylindrical plug member and in which four laser diodes (LDs) 31, 32, 33 and 34 (emission points) aligned in a row at given intervals are arranged on a leading end surface F thereof. The four LDs 31 to 34 are aligned on a line at an angle of inclination to each of a main scanning direction and a sub scanning direction. Note that although the monolithic multi-laser diode with four LDs is described as an example in this embodiment, the laser light source 30 only has to be a monolithic multi-laser diode in which two or more LDs are arranged on the same chip.

The collimator lens 51 is a lens for converting a divergent bundle of light emitted from the laser light source 30 into parallel light. The cylindrical lens 52 is a lens for converting the parallel bundle of light into linear light long in the main scanning direction and focusing the linear light on the deflector 40 (polygon mirror 41).

The deflector 40 is for deflecting and scanning a beam of light focused by the cylindrical lens 52 by reflecting it and includes the polygon mirror 41 and a polygon motor 42. The polygon mirror 41 rotates at a predetermined speed in a direction of an arrow R in FIG. 2 to deflect the beam of light so that the beam of light is scanned in a longitudinal direction (main scanning direction) of the photoconductive drum 14. The polygon motor 42 generates a rotational force for rotating the polygon mirror 41 at the predetermined speed. The polygon mirror 41 is coupled to a rotary shaft 43 of the polygon motor 42 and rotates about the rotary shaft 43. Note that a MEMS (Micro Electro Mechanical Systems) mirror may be used as the deflector 40.

The first and second scanning lenses 53, 54 are lenses having an fθ characteristic and include a lens surface (rotationally asymmetric refractive surface) which is a special toric surface. These scanning lenses 53, 54 are arranged to face each other on an optical axis from the polygon mirror 41 to the circumferential surface of the photoconductive drum 14. The first and second scanning lenses 53, 54 condense the deflected beam of light reflected by the polygon mirror 41 and focus it on the circumferential surface of the photoconductive drum 14.

The mirror 55 reflects the deflected beam of light output from the first and second scanning lines 53, 54 toward an unillustrated opening provided in the housing 20 to irradiate it to the photoconductive drum 14. The first and second condenser lenses 56A, 56B are lenses which are arranged on the optical path outside the range of an effective scanning area on the circumferential surface of the photoconductive drum 14 by the polygon mirror 41 and respectively focus the deflected beam of light on the first and second BD sensors 6A, 6B.

The first and second BD sensors 6A, 6B detect the deflected beam of light to synchronize a write timing which is a timing at which the irradiation of the deflected beam of light to the circumferential surface of the photoconductive drum 14 is started for main scanning line. The first and second BD sensors 6A, 6B are respectively arranged at a scan start side of the main scanning line and a scan end side of the main scanning line. Each of the first and second BD sensors 6A, 6B is composed of a photodiode and the like, and outputs a high-level signal when no beam of light is detected and outputs a low-level signal while a beam of light passes through a light receiving surface thereof.

Figure 3:
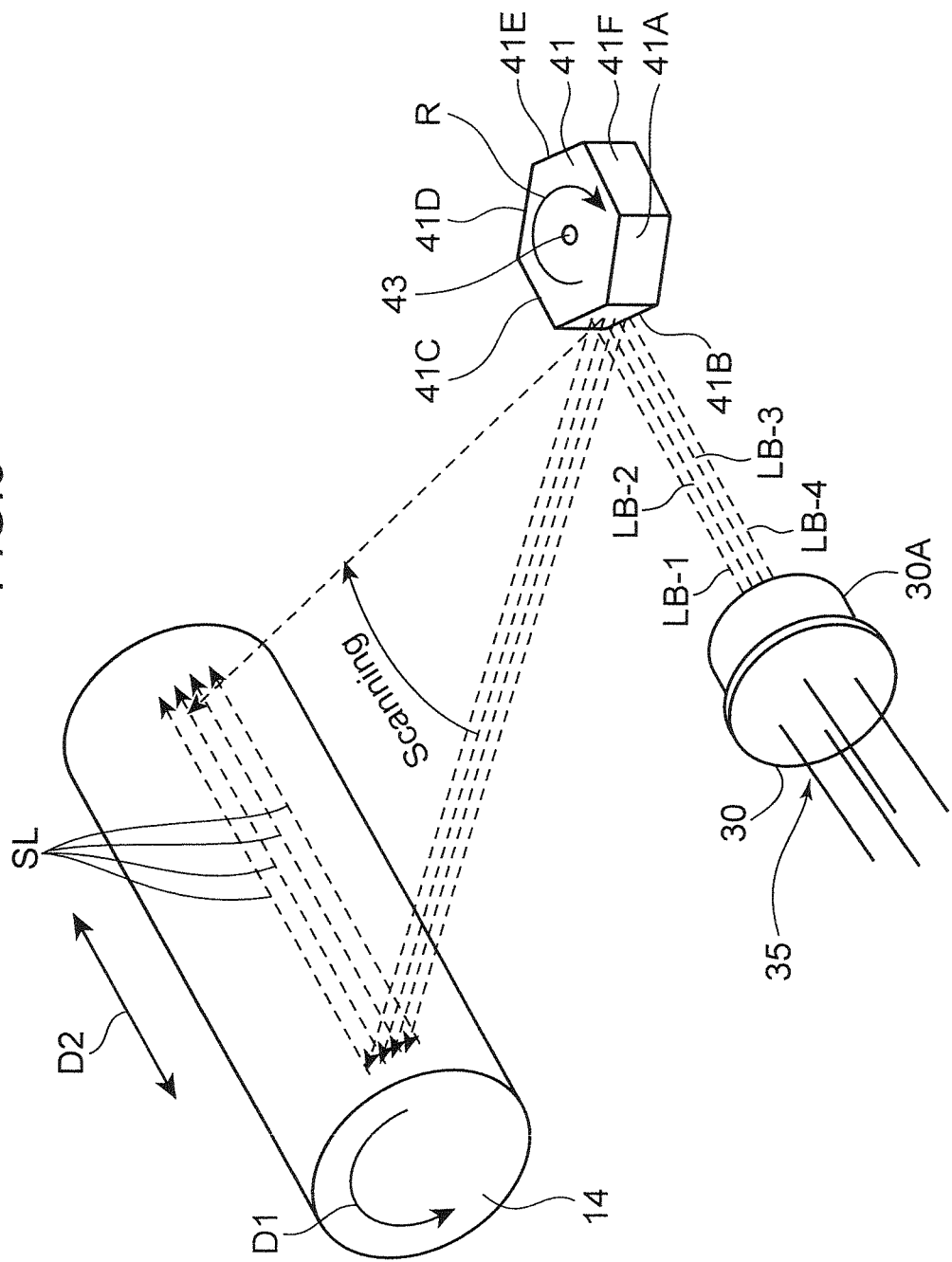
FIG. 3 is a perspective view diagrammatically showing an exposure mode of a photoconductive drum by a multi-beam system.

As shown in FIG. 3, four laser beams LB-1 to LB-4 are emitted from the LDs 31 to 34 of the laser light source 30 toward the polygon mirror 41. Note that the imaging optical system is not shown in FIG. 3. The polygon mirror 41 is rotated at a high speed in the direction of the arrow R about the rotary shaft 43 by the polygon motor 42. The polygon mirror 41 includes six mirror surfaces 41A, 41B, 41C, 41D, 41E and 41F. The four laser beams LB-1 to LB-4 are irradiated to one mirror surface (mirror surface 41B in FIG. 3) at a certain timing and refracted and reflected in a direction toward the circumferential surface of the photoconductive drum 14 by this mirror surface 41B. According to the rotation of the polygon mirror 41, the four laser beams LB-1 to LB-4 scan the circumferential surface of the photoconductive drum 114 along a main scanning direction D2. In this way, four scanning lines SL are drawn on the circumferential surface of the photoconductive drum 14. Since the laser beams LB-1 to LB-4 are modulated according to image data, an electrostatic latent image corresponding to the image data is formed on the circumferential surface of the photoconductive drum 14.

Figure 4:
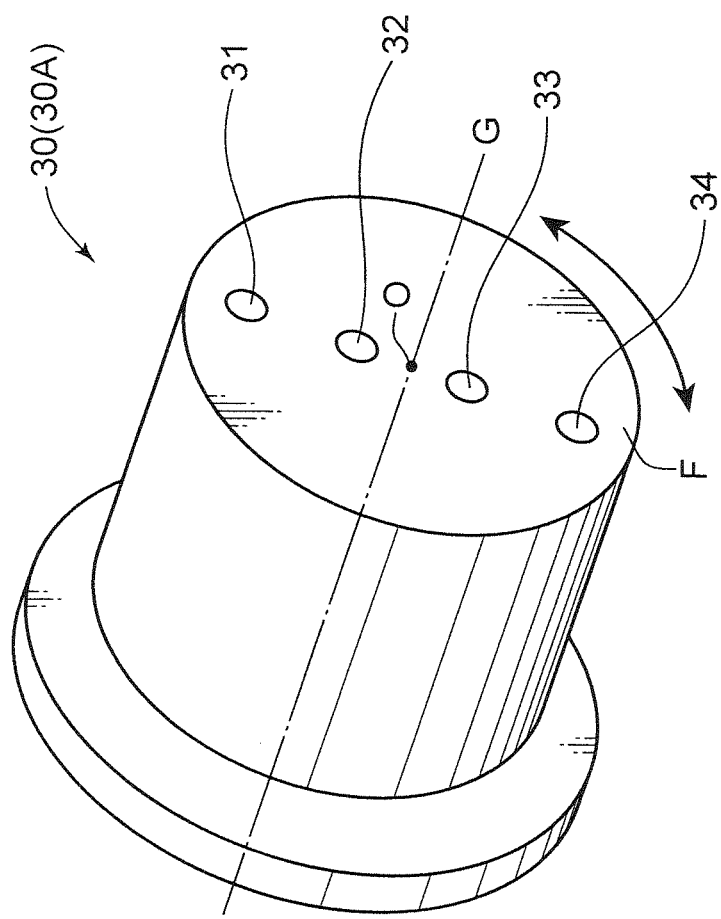
FIG. 4 is a perspective view showing a light emitter of a multi-beam laser light source.

Here, the four laser beams LB-1 to LB-4 draw the four scanning lines SL in the main scanning direction D2 while being arranged in the order of the laser beams LB-1, LB-2, LB-3 and LB-4 in the sub scanning direction D1 (rotating direction of the photoconductive drum 14 in FIG. 3). This is because the four LDs 31 to 34 are linearly aligned at given intervals as shown in FIG. 4. Accordingly, a beam pitch of the laser beams LB-1 to LB-4 in the sub scanning direction, i.e. resolution (dpi) of an image to be drawn, depends on an arrangement pitch of the four LDs 31 to 34.

The above beam pitch can be adjusted by rotating the light emitter 30A about the center of a holder member. Specifically, by rotating the light emitter 30A in directions of arrows in FIG. 4 about a normal line G passing through a center O of the leading end surface F of the light emitter 30A as an axis of rotation, the arrangement pitch of the four LDs 31 to 34 can be changed on the surface. That is, if the light emitter 30A is rotated clockwise about the normal line G, the beam pitch in the sub scanning direction becomes smaller. Conversely, if the light emitter 30A is rotated counterclockwise, the beam pitch in the sub scanning direction becomes larger. Thus, the beam pitch corresponding to a set resolution of an image can be obtained by rotationally adjusting the light emitter 30A.

Although the laser light source 30 and the first and second BD sensors 6A, 6B are drawn to be separated to simplify graphical representation in FIG. 2, the laser light source 30 and either one of the first and second BD sensors 6A, 6B (hereinafter, referred to as BD sensor 6) are mounted on the same circuit board 70.

Figure 5:
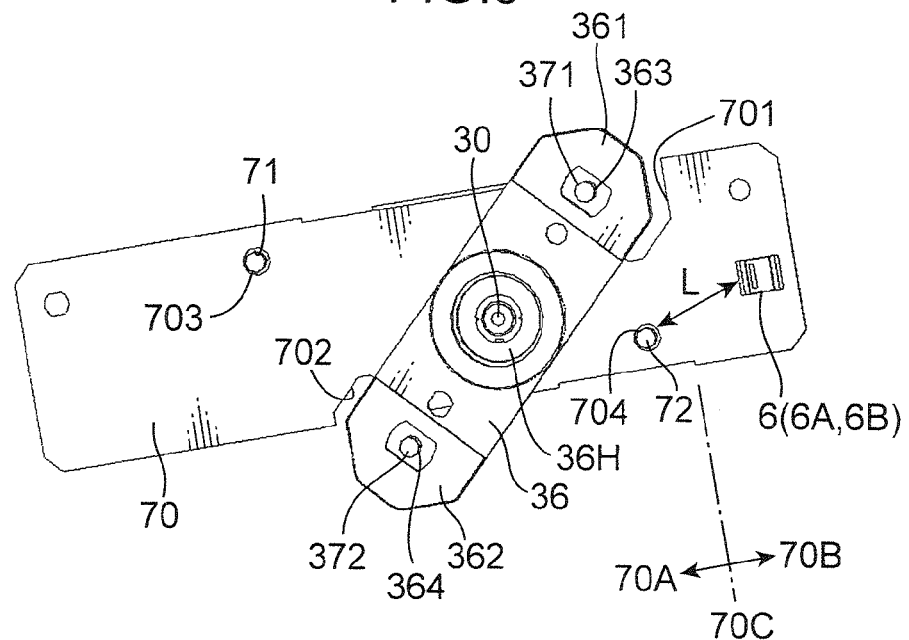
FIG. 5 is a front view of a bracket and a circuit board.
Figure 6:
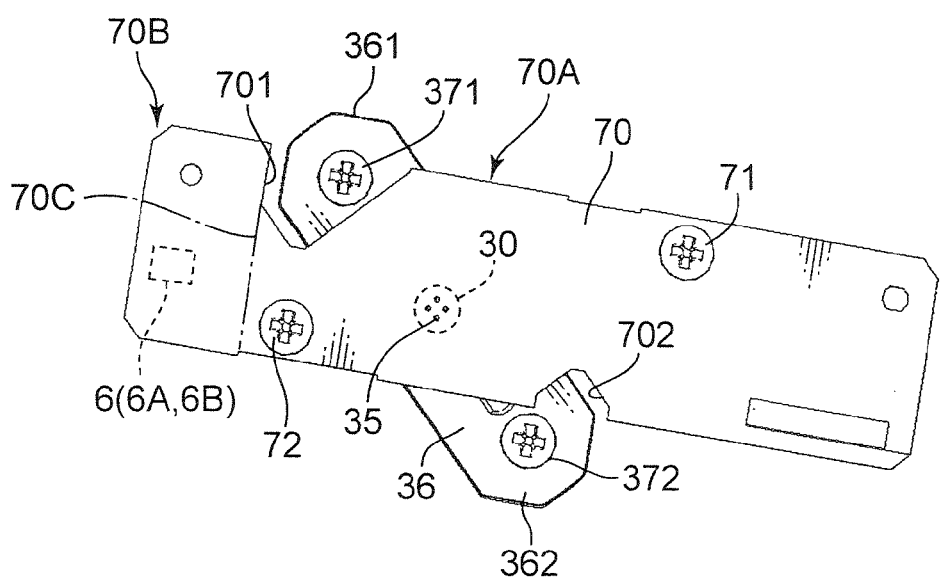
FIG. 6 is a rear view of the bracket and the circuit board.

As shown in FIGS. 5 and 6, the circuit board 70 is a board on which circuit components (not shown) such as a drive circuit for the laser light source 30 and an APC (Automatic Power Control) circuit for an emission light quantity control of the LDs 31 to 34 are mounted and, in this embodiment, the laser light source 30 held by a bracket 36 and the BD sensor 6 are mounted. The circuit board 70 has a rectangular shape.

First and second cut portions 701, 702 are respectively provided on a pair of longer sides of the circuit board 70. The first cut portion 701 is provided near an end portion of the upper longer side and in the form of a substantially right-triangular cut. The second cut portion 702 is provided near the center of the lower longer side and in the form of a substantially isosceles triangular cut. Further, first and second board screw holes 703, 704 are respectively perforated near the respective longer sides of the circuit board 70. The first and second board screw holes 703, 704 are arranged at substantially diagonal positions of the circuit board 70 across the mounted position of the laser light source 30.

The BD sensor 6 is mounted at a position near one shorter side of the circuit board 70. The second board screw hole 704 is perforated at a position near the shorter side proximate to the BD sensor 6. Thus, a distance L between the BD sensor 6 and the second board screw hole 704 is relatively short and the BD sensor 6 is mounted at the position near the second board screw hole 704.

The bracket 36 (holding member/part of an adjustment mechanism) is a rectangular flat plate member for fixedly holding the laser light source 30 and including a first end portion 361 and a second end portion 362 in a longitudinal direction thereof. A holder portion 36H into which the cylindrical plug member of the light emitter 30A of the laser light source 30 is to be inserted is perforated at a central position of the bracket 36. An inner diameter of the holder portion 36H is slightly smaller than an outer diameter of the plug member of the light emitter 30A, so that the light emitter 30A is press-fitted into the holder portion 36H. By this press-fitting, the light emitter 30A and the bracket 36 are united. Further, a first holding hole 363 and a second holding hole 364 (screw hole) are respectively perforated near the first and second end portions 361, 362 of the bracket 36.

Figure 7:
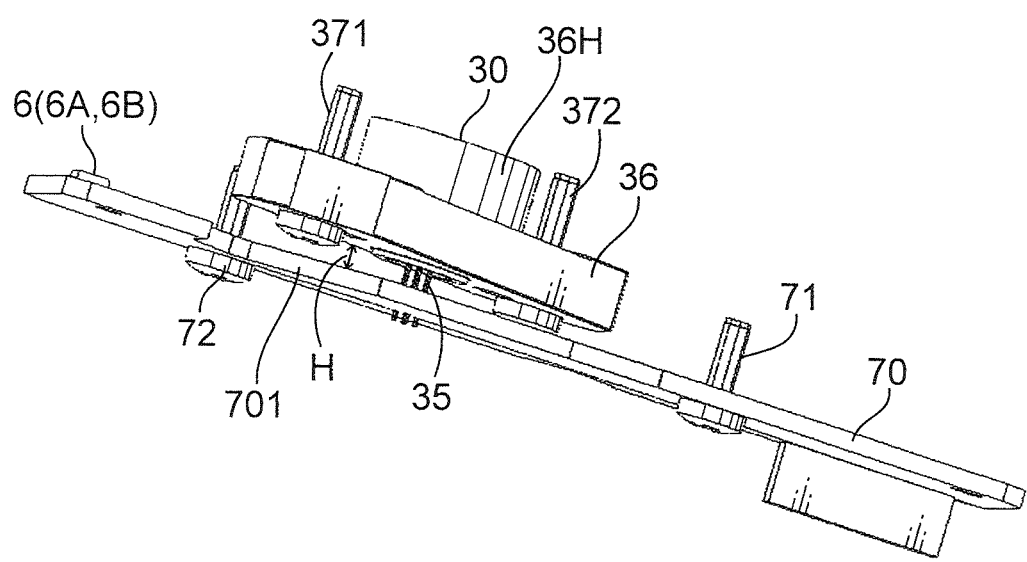
FIG. 7 is a perspective view showing a mounted state of the bracket and a BD sensor on the circuit board.
Figure 8:
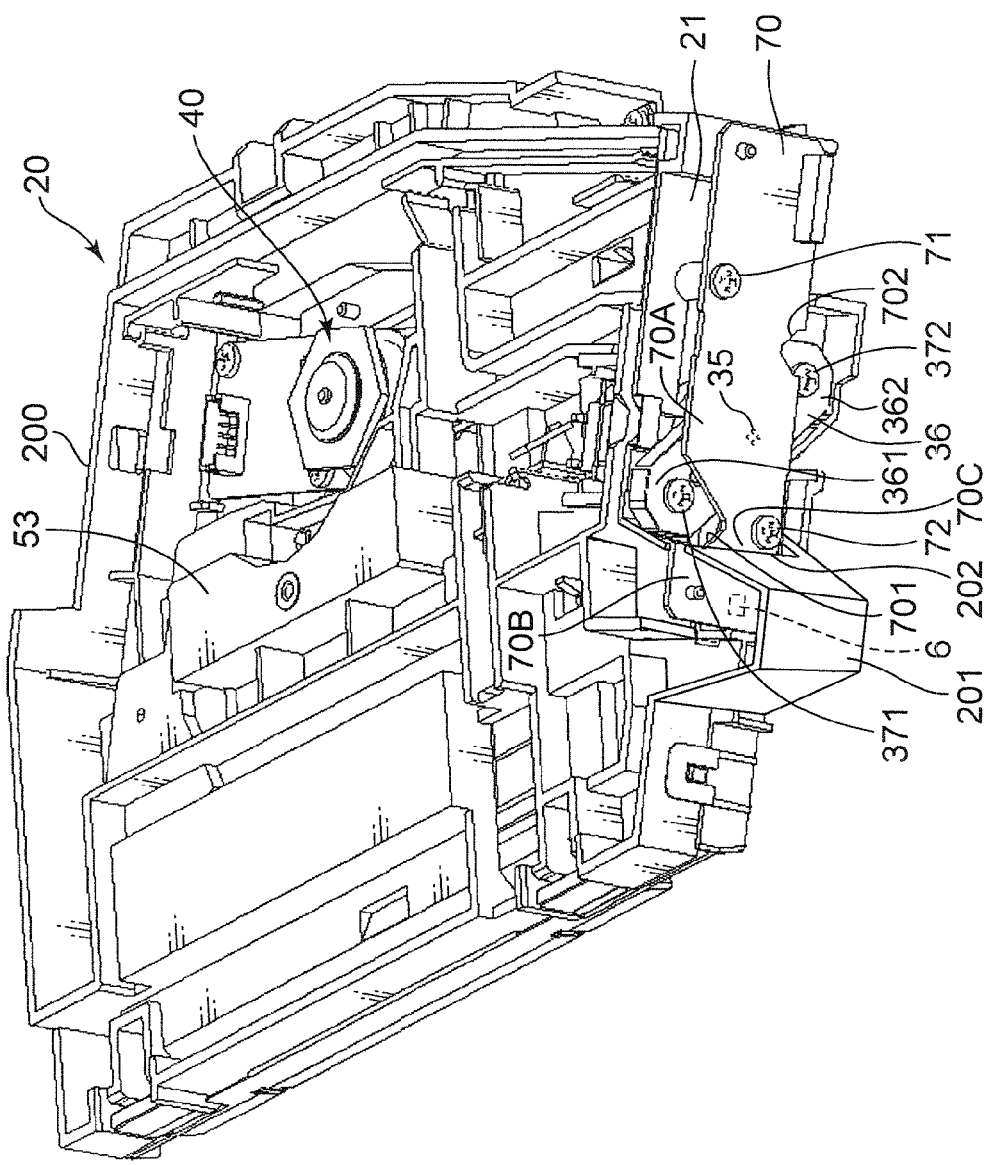
FIG. 8 is a perspective view showing a housing of the optical scanning device and the bracket and the circuit board mounted on the housing.

The laser light source 30 is mounted on the circuit board 70 in a state where a lower end portion of the lead portion thereof is inserted in a mount hole provided on the circuit board 70 and soldered at this inserted part. In other words, the circuit board 70 and the bracket 36 are coupled only by the lead portion 35. The lead portion 35 has a predetermined length and the light emitter 30A stands above the circuit board 70 with a predetermined clearance H present between the circuit board 70 and the bracket 36 as shown in FIG. 7. This predetermined clearance H is dimensioned to permit the lead portion 35 to be twisted in rotationally adjusting the light emitter 30A about the optical axis and fixing the circuit board 70 by a lid member 23 (FIGS. 9 and 10).

In this embodiment, a mounting area of the circuit board 70 is divided into a first part 70A where the laser light source (bracket 36) is mounted and a second part 70B where the BD sensor 6 is mounted as shown in FIGS. 5 and 6. In this embodiment, the first part 70A accounts for most of the circuit board 70, and this first part 70A is arranged outside the housing of the optical scanning device 11. On the other hand, the second part 70B is a small area part of one end portion of the circuit board 70, and this second part 70B is arranged inside the housing 20. An intermediate part 70C between the first and second parts 70A, 70B serves as a part passed through a side wall surface of the housing 20.

The housing 20 includes a housing main body 200 with an upper surface opening and a cavity for housing the deflector 40 and the imaging optical system, and the lid member 23 (diagrammatically shown in FIGS. 9 and 10) for closing the upper surface opening of this housing main body. The housing main body 200 includes a bulging portion 201 near its part where the circuit board 70 is mounted. A slit 202 through which the circuit board 70 is passed is vertically provided in one side wall (wall surface of the housing) of this bulging portion 201.

Figure 9:
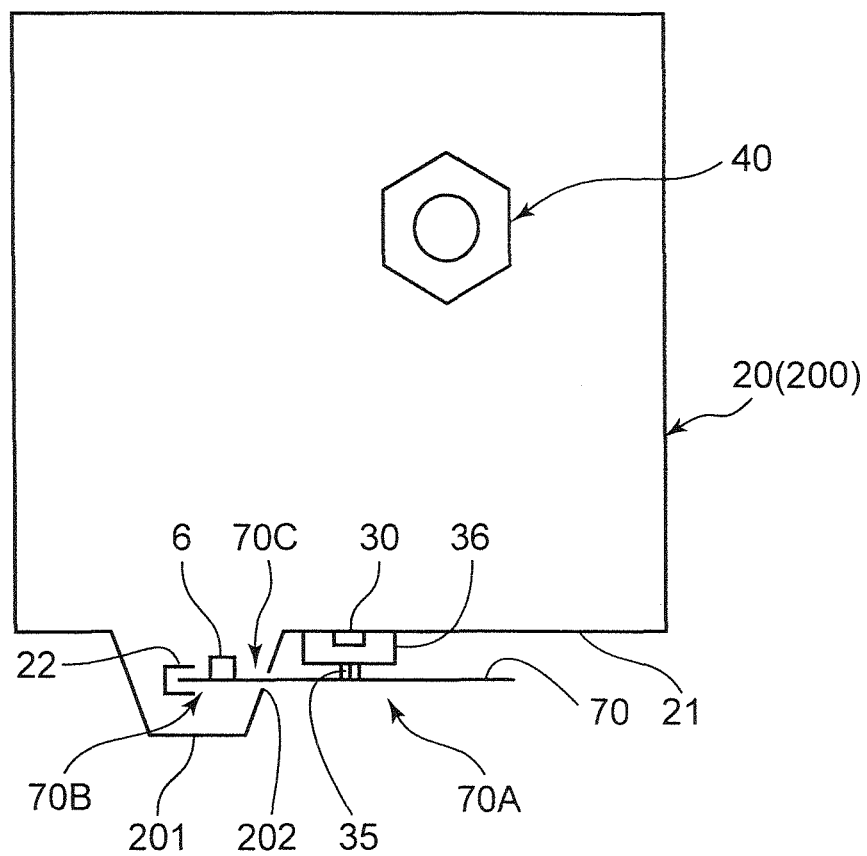
FIG. 9 is a diagrammatic top view showing the optical scanning device.
Figure 10:
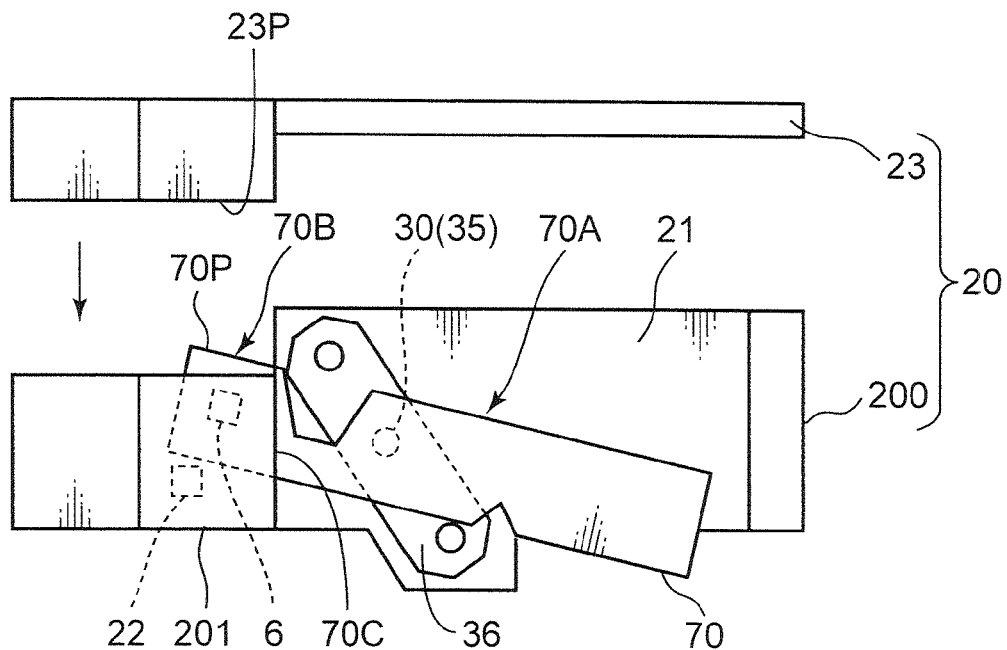
FIG. 10 is a diagrammatic side view of the optical scanning device showing a state where a lid member is detached from a housing main body.

Also with reference to a diagrammatic top view shown in FIG. 9, the circuit board 70 is assembled with the housing main body 200 such that a most part of the circuit board 70 faces a mounting plate 21 constituting a part of a side wall of the housing main body 200 and the remaining part is housed in the housing 20. Specifically, the first part 70A where the laser light source 30 is mounted is arranged in parallel to and at a predetermined distance from the mounting plate 21 outside the housing main body 200, and the second part 70B where the BD sensor 6 is mounted is inserted in the bulging portion 201 of the housing main body 200. An edge part of the second part 70B is fitted in a positioning groove 22 projecting in the bulging portion 201. The intermediate part 70C is fitted in the slit 202.

The bracket 36 and the circuit board 70 are respectively individually fixed to the mounting plate 21. The bracket 36 is fixed at a predetermined position of the mounting plate 21 by first and second holding screws 371, 372 (screw). Further, the circuit board 70 is fixed at a predetermined position of the mounting plate 21 by first and second board screws 71, 72.

Specifically, the first and second holding screws 371, 372 are respectively inserted into the first and second holding holes 363, 364 and fastened to screw holes provided at first positions of the mounting plate 21, whereby the bracket 36 is fixed to the mounting plate 21. On the other hand, the first and second board screws 71, 72 are respectively inserted into the first and second board screw hole 703, 704 and fastened to screw holes provided at second positions of the mounting plate 21, whereby the circuit board 70 is fixed to the mounting plate 21. Note that, in another embodiment, the circuit board 70 is not fixed by the first and second board screws 71, 72 and may be fixed only by a pressing force by the lid member 23 to be described later.

Here, the circuit board 70 and the bracket 36 are mounted on the housing 20 in a state where the bracket 36 is covered by the circuit board 70. That is, the both are mounted on the mounting plate 21 in a state shown in FIG. 6. Further, the bracket 36 is mounted obliquely with respect to the circuit board 70 such that a part of the first end portion 361 of the bracket 36 and a part of the second end portion 362 thereof are respectively exposed through the first cut portion 701 and the second cut portion 702 of the circuit board 70 when viewed in an overlapping direction of the circuit board 70 and the bracket 36. By this, even if the bracket 36 rotates about the lead portion 35 as a rotary shaft, particularly even if the bracket 36 rotates counterclockwise in FIG. 6, the first and second holding holes 363, 364 are exposed through the first and second cut portions 701, 702. Thus, operability in tightening the first and second holding screws 371, 372 by a user can be made better.

Further, the BD sensor 6 is mounted at the position near the second board screw hole 704. That is, the vicinity of the mounted position of the BD sensor 6 is the fixed position by the second board screw 72. This can make it difficult for vibration generated by the rotational drive of the polygon mirror 41 and the like to affect the BD sensor 6.

Figure 11:
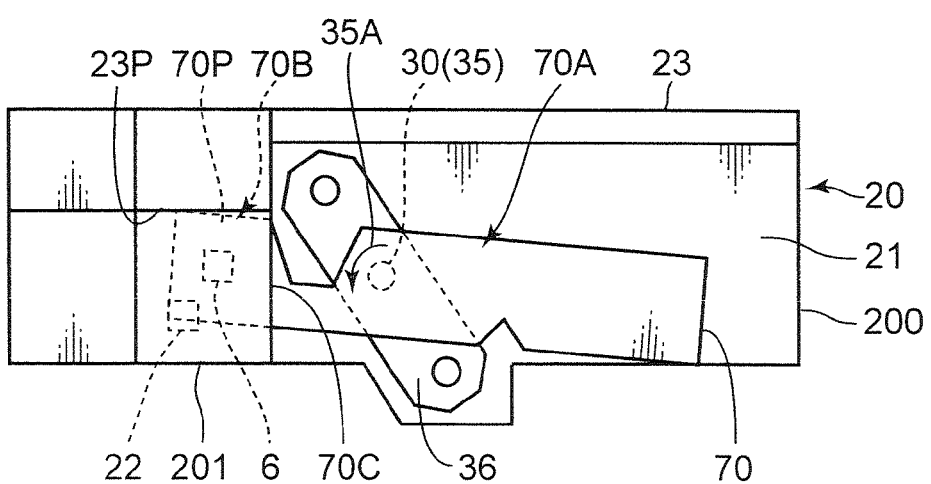
FIG. 11 is a diagrammatic side view of the optical scanning device showing a state where the lid member is attached to the housing main body.

FIG. 10 is a diagrammatic side view of the housing 20 (optical scanning device 11) showing a state where the lid member (pressing member) is detached (separated) from the housing main body 200 (second posture) and FIG. 11 shows a state where the lid member 23 is attached to the housing main body 200 (first posture). The lid member 23 is a member for covering the upper surface opening for anti-dust purpose after the optical components and the like are mounted into the housing main body 200. With the lid member 23 attached to the housing main body 200, a lower edge portion 23P of the lid member 23 presses an upper edge portion 70P of the second part 70B of the circuit board 70. By this pressing, a lower edge portion of the second part 70B is fitted into the positioning groove 22. By this fitting, the installed position of the BD sensor 6 is determined. That is, only by attaching the lid member 23 to the housing main body 200, the circuit board 70 is positioned and fixed and the BD sensor 6 is also mounted at the predetermined position in the housing 20.

Next, a procedure of fixing an assembly of the bracket 36 and the circuit board 70 to the housing 20, associated with the rotational adjustment of the light emitter 30A of the laser light source 30 is described with reference to FIGS. 8 to 11. First, the circuit board 70 is so mounted on the housing main body 200 that the intermediate part 70C is fitted in the slit 202 as described above. At this time, to prevent the entrance of dust into the housing 20, a spongy seal member is desirably interposed between the intermediate part 70C and the slit 202. Then, an operator adjusts the beam pitch of laser beams LB-1 to LB-4 emitted from the laser light source 30 in the sub scanning direction using an unillustrated jig. The jig is used to press and hold the bracket 36 on a predetermined contact surface of the housing 20 so that the bracket 36 is right opposed to the housing 20.

In a state where the bracket 36 is held by the jig, the operator relatively rotates the bracket 36 and the light emitter 30A so that the light emitter 30A appropriately rotates about the optical axis (normal line G). In this rotating process, a position where the beam pitch in the sub scanning direction matches the specified resolution (dpi) is detected. After the rotational adjustment of the light emitter 30A is finished, the operator fixes the bracket 36 to the mounting plate 21 (outer surface of the housing) of the housing main body 200 using the first and second holding screws 371, 372. Note that, at this stage, the circuit board 70 itself is indirectly held on the mounting plate 21 via the lead portion 35 without being directly fixed to the mounting plate 21. In addition, since the lead portion 35 has such a length that the predetermined clearance H is present between the circuit board 70 and the bracket 36, the circuit board 70 is movable to a certain extent by the deformation (twisting movement) of the lead portion 35.

Thereafter, the operator attaches the lid member 23 to the opening of the housing main body 200. Before the lid member 23 is attached, the upper edge portion 70P of the second part 70B of the circuit board 70 slightly projects from the upper edge of the housing main body 200 as shown in FIG. 10. By attaching the lid member 23, the lower edge portion 23P of the lid member 23 presses the upper edge portion 70P of the second part 70B. By this pressing, the circuit board 70 is rotated (twisted) counterclockwise as shown by an arrow 35A of FIG. 11 about the lead portion 35 as a center of rotation (twisting).

By the above rotation of the circuit board 70, the lower edge portion of the second part 70B is pressed and fitted into the positioning groove 22. In this way, coupled with a torsional reaction force of the lead portion 35, the circuit board 70 is positioned and fixed. Further, the positioning of the BD sensor 6 in the housing 20 is also completed. Thus, although the circuit board 70 is fixed using the first and second board screws 71, 72 in FIGS. 5 to 8, the circuit board 70 and the BD sensor 6 can be positioned and fixed by attaching the lid member 23 without depending on these screws.

As described above, according to this embodiment, the intermediate part 70C of the circuit board 70 on which the laser light source 30 and the BD sensor 6 are mounted passes through the slit 202 provided on the wall surface of the housing 20 and the circuit board 70 is fixed to the outer surface of the housing 20 by the bracket 36 (adjustment mechanism) with the beam pitch adjusted. Further, the first part 70A of the circuit board 70 where the laser light source 30 is mounted appears outside the housing 20. Thus, the user can easily rotate the light emitter 30A about the optical axis. On the other hand, since the second part 70B where the BD sensor 6 is mounted is housed in the housing 20, the influence of dust on the BD sensor 6 can be prevented.

Further, the device of this embodiment is configured to press the upper edge portion 70P of the second part 70B by the lower edge portion 23P of the lid member 23 and position and fix the circuit board 70 to the housing 20 by attaching the lid member 23 as the pressing member to the housing main body 200. Thus, the circuit board 70 is fixed by mounting the bracket 36 on the outer surface of the housing 20 and attaching the lid member 23 to the housing main body 200 to press a part of the circuit board 70. That is, the circuit board 70 can be fixed only by a pressing force of the lid member 23 without fixing the circuit board 70 itself to the housing 20 by screws or the like.

The light emitter 30A is supported to stand at a predetermined height above the circuit board 70 only by the lead portion 35 and this lead portion 35 takes up the rotation of the light emitter 30A about the optical axis by its twisting movement. Thus, even if the light emitter 30A is rotated about the optical axis to adjust an interval between the beams of light and the circuit board 70 is fixed in that state, a twist between the light emitter 30A and the circuit board 70 caused in association with the rotation is taken up by the lead portion 35. Thus, the interval adjustment and the alignment of the BD sensor 6 with the optical axis can be respectively individually and reliably performed.

According to the optical scanning device 11 having the above features and the image forming apparatus 1 provided with this, both the adjustment of the light emitter 30A about the optical axis and the incidence of a detection beam of light on the BD sensor 6 can be ensured without requiring a special optical element while the configuration for mounting the laser light source 30 and the BD sensor 6 for the synchronization of a write timing on the same circuit board 70 is adopted. Thus, the number of the components of the optical scanning device 11 and the image forming apparatus 1 can be decreased and cost can be reduced.

Although the optical scanning device 11 and the image forming apparatus 1 according to the embodiment of the present disclosure have been described above, the present disclosure is not limited to this and can be, for example, modified as follows.

(1) In the above embodiment, the lid member 23 of the housing 20 functions as the pressing member for pressing the circuit board 70. This is an example and a lever member or the like for pressing the circuit board 70 may be, for example, provided on the housing main body 200.

(2) In the above embodiment, the bracket 36 (adjustment mechanism/holding member) is mounted on the mounting plate 21 of the housing main body 200 by screwing. Instead of screwing, another mounting means, for example, such as convex-concave engagement or groove engagement may be adopted.

Although the present discloser has been fully described by way of example with reference to the accompanying drawings, it is to be understood that various changes and modifications will be apparent to those skilled in the art. Therefore, unless otherwise such changes and modifications depart from the scope of the present discloser hereinafter defined, they should be construed as being included therein.

What is claimed is:

1. An optical scanning device, comprising:
a light source with a plurality of emission points for emitting beams of light;
a deflector for deflecting and scanning the beams of light by reflecting the beams of light;
an imaging optical system for imaging the deflected and scanned beams of light on a surface to be scanned;
a housing for housing at least the deflector and the imaging optical system;
a synchronization sensor for receiving the deflected and scanned beams of light and outputting a detection signal indicating light reception;
a circuit board on which the light source and the synchronization sensor are mounted; and
an adjustment mechanism for enabling an adjustment of an interval between the beams of light respectively emitted from the plurality of emission points on the surface to be scanned by rotating the light source about an optical axis of the light source;
wherein:

the circuit board includes a first part on which the light source is mounted, a second part on which the synchronization sensor is mounted and an intermediate part between the first and second parts;
the first part is arranged outside the housing, the second part is arranged inside the housing and the intermediate part passes through a wall surface of the housing; and
the adjustment mechanism fixes the light source using the housing with the interval adjusted.

2. An optical scanning device according to claim 1, wherein:
the light source is mounted on the circuit board rotatably about the optical axis thereof; and
the adjustment mechanism includes a holding member for fixedly holding the light source and the holding member is mounted on an outer surface of the housing with the interval adjusted.

3. An optical scanning device according to claim 2, wherein:
the holding member includes a screw hole and is mounted on the outer surface of the housing by screwing, and the circuit board is arranged on the holding member in an overlapping manner, and
the circuit board includes a cut portion for exposing the screw hole when viewed in an overlapping direction of the circuit board and the holding member.

4. An optical scanning device according to claim 2, further comprising a pressing member capable of changing a posture between a first posture in which the pressing member is mounted at a predetermined position of the housing and a second posture in which the pressing member is separated from the predetermined position, wherein:
the pressing member presses a part of the circuit board and positions and fixes the circuit board to the housing in the first posture.

5. An optical scanning device according to claim 4, wherein:
the housing includes a housing main body with an opening and a cavity for housing the deflector and the imaging optical system, and a lid member for closing the opening of the housing main body;
the holding member is mounted on the outer surface of the housing main body; and
the pressing member is the lid member, the first posture is a state where the lid member is attached to the opening and the second posture is a state where the lid member is detached from the opening.

6. An optical scanning device according to claim 2, wherein:
the light source includes a light emitter with the plurality of emission points and a lead portion for feeding power to the light emitter and the light emitter is caused to stand at a predetermined height above the circuit board by the lead portion;
the holding member fixedly holds the light emitter; and
the lead portion takes up the rotation of the light emitter about the optical axis by a twisting movement thereof.

7. An image forming apparatus, comprising:
an optical scanning device; and
an image bearing member with a bearing surface for an electrostatic latent image which serves as a surface to be scanned,
the optical scanning device including:
a light source with a plurality of emission points for emitting beams of light;
a deflector for deflecting and scanning the beams of light by reflecting the beams of light;

an imaging optical system for imaging the deflected and scanned beams of light on the surface to be scanned;

a housing for housing at least the deflector and the imaging optical system;

a synchronization sensor for receiving the deflected and scanned beams of light and outputting a detection signal indicating light reception;

a circuit board on which the light source and the synchronization sensor are mounted; and an adjustment mechanism for enabling an adjustment of an interval between the beams of light respectively emitted from the plurality of emission points on the surface to be scanned by rotating the light source about an optical axis of the light source;

wherein:

the circuit board includes a first part on which the light source is mounted, a second part on which the synchronization sensor is mounted and an intermediate part between the first and second parts;

the first part is arranged outside the housing, the second part is arranged inside the housing and the intermediate part passes through a wall surface of the housing; and the adjustment mechanism fixes the light source using the housing with the interval adjusted.

8. An image forming apparatus according to claim 7, wherein:

the light source is mounted on the circuit board rotatably about the optical axis thereof; and the adjustment mechanism includes a holding member for fixedly holding the light source and the holding member is mounted on an outer surface of the housing with the interval adjusted.

* * * * *